(12) United States Patent
Ertel

(10) Patent No.: US 11,535,455 B1
(45) Date of Patent: Dec. 27, 2022

(54) TENSIONING DEVICE FOR AN ENDLESS BELT CONVEYOR

(71) Applicant: Dorner Mfg. Corp., Hartland, WI (US)

(72) Inventor: Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 17/395,546

(22) Filed: Aug. 6, 2021

(51) Int. Cl.
B65G 23/44 (2006.01)

(52) U.S. Cl.
CPC .................................. B65G 23/44 (2013.01)

(58) Field of Classification Search
CPC ....................................................... B65G 23/44
USPC ........................................ 198/813, 814, 815
See application file for complete search history.

(56) References Cited

U.S. PATENT DOCUMENTS

| | | | | |
|---|---|---|---|---|
| 3,593,591 | A * | 7/1971 | Chantland | F16H 7/14 198/813 |
| 5,174,435 | A * | 12/1992 | Dorner | B65G 23/44 198/816 |
| 5,895,332 | A * | 4/1999 | Olson | B65G 23/44 198/813 |
| 5,896,979 | A * | 4/1999 | Hokari | G03G 15/0194 198/814 |
| 5,984,083 | A * | 11/1999 | Hosch | B65G 23/44 198/810.04 |
| 6,209,715 | B1 * | 4/2001 | Eltvedt | B65G 23/44 198/816 |
| 6,279,733 | B2 | 8/2001 | Eltvedt | |
| 6,560,428 | B2 | 5/2003 | Sanchez-Banos et al. | |
| 6,971,509 | B2 | 12/2005 | Ertel et al. | |
| 6,997,307 | B2 | 2/2006 | Iseli | |
| 7,024,136 | B2 * | 4/2006 | Fiore | G03G 15/00 198/814 |
| 7,681,719 | B2 | 3/2010 | Hosch et al. | |
| 7,957,672 | B2 | 6/2011 | Kato et al. | |
| 10,800,610 | B1 | 10/2020 | DeGraw et al. | |
| 2011/0293336 | A1 * | 12/2011 | Noso | G03G 15/1615 399/302 |
| 2015/0329292 | A1 * | 11/2015 | Kawanami | B65G 39/16 198/813 |

FOREIGN PATENT DOCUMENTS

| EP | 1056382 B1 | 7/2003 |
|---|---|---|
| EP | 1354829 B1 | 6/2006 |

* cited by examiner

Primary Examiner — James R Bidwell
(74) Attorney, Agent, or Firm — Andrus Intellectual Property Law, LLP

(57) ABSTRACT

A transfer tail assembly for use with a conveyor assembly that adjust the tension in the conveyor belt. The transfer tail assembly includes a pair of adjustment brackets that are each movable along a conveyor axis and support an end roller. The movement of the adjustment brackets and the end roller adjust the tension in the conveyor belt. A spiral cam is positioned such that rotation of the spiral cam causes movement of the end roller along the conveyor axis. A drive pin of the adjustment bracket moves along a spiral cam contact surface. The end roller is pivotable relative to the conveyor frame to release tension on the conveyor belt. The final position of the end roller can be adjusted using a pivot limiting bar.

17 Claims, 9 Drawing Sheets

TENSIONING DEVICE FOR AN ENDLESS BELT CONVEYOR

BACKGROUND

The present disclosure generally relates to a transfer tail assembly for a conveyor having a conveyor belt. More specifically, the present disclosure relates to a transfer tail assembly that includes a spiral cam for adjusting the tension in the conveyor belt and can pivot upward to allow for the release of tension on the conveyor belt.

Presently, in food processing conveyor applications, conveyors must be manufactured such that the conveyor belt can be removed and the entire conveyor frame assembly sanitized. Following sanitation, the conveyor belt must be reinstalled for continued operation. Numerous guidelines exist to regulate the type of conveyor assembly that be used in a sanitary environment, such as in a food processing facility. Typically, these guidelines require that the conveyor frame assembly must be capable of being disassembled and sanitized on a regular, scheduled basis. Since the conveyor frame assembly must be sanitized regularly, the conveyor assembly must be capable of being quickly disassembled to allow complete cleaning. Preferably, the disassembly should require minimal tool to no tools.

After installation of the conveyor belt and after a period of operation, the conveyor belt can stretch such that the tension in the conveyor belt is reduced. In such situations, the position of the end roller is typically adjusted to increase the tension on the conveyor belt. Presently, tension adjusting solutions exist that include long screws and threaded nuts to support the end roller. When the tension in the conveyor belt needs to be adjusted, the position of the end roller is extended away from the conveyor frame to reintroduce the proper level of tension. Although this solution works to adjust the tension in the conveyor belt, the threads on the adjustment screws are difficult to clean and sanitize.

Current conveyor systems can also include a tip up tail assembly that allows the end roller to be pivoted upward to release tension on the conveyor belt such that the conveyor belt can be removed to allow the frame to be cleaned and sanitized. However, the pivoting movement in such tip up tail assemblies returns the end roller to a set position that cannot be adjusted.

The present inventors have recognized these drawback and limitations with current conveyor belt tensioning systems and have developed the system of the present disclosure.

SUMMARY

The present disclosure relates to a transfer tail assembly for use with a conveyor having a conveyor belt to adjust the tension in the conveyor belt and to release the conveyor belt for removal and cleaning.

The transfer tail assembly is designed for use with a conveyor assembly that includes a conveyor frame having a pair of spaced side frame members, the conveyor frame extends along a conveyor axis and the conveyor belt includes upper and lower runs supported by the conveyor frame. The transfer tail assembly includes a pair of side brackets that are each mounted to the pair of side frame members. The side brackets are stationary relative to the conveyor axis.

A pair of adjustment brackets are supported along the pair of side brackets and are movable relative to the side brackets in a direction parallel to the conveyor axis. The adjustment brackets each support one end of an end roller such that the end roller is movable with the adjustment brackets.

A spiral cam is mounted to one of the pair of side brackets and is rotatable about a center axis of the spiral cam. The spiral cam is in contact with one of the adjustment brackets such that rotation of the spiral cam about the center axis causes movement of the adjustment bracket in a direction parallel to the conveyor axis. In this manner, rotation of the spiral cam changes the position of the end roller to either increase or decrease the tension in the conveyor belt.

In one exemplary embodiment, the spiral cam includes a spiral contact surface that engages a drive pin on the adjustment bracket. The spiral contact surface is designed such that the distance of the spiral contact surface from the center axis of the spiral cam increases from a first end to a second end. As the spiral cam is rotated, the drive pin moves along the spiral contact surface to move the drive pin toward or away from the center axis. Such movement causes corresponding movement of the end roller along the conveyor axis.

In one exemplary embodiment, the transfer tail assembly further includes a pivot rod that extends across the width of the conveyor frame. The pivot rod is connected at each end to one of the side brackets. The pivot rod allows the side brackets, and thus the end roller supported by the side brackets, to pivot relative to the side frame members. The pivot rod includes at least one pivot limiting arm that extends from the outer surface of the pivot rod. The pivot limiting arm contacts a pivot limiting bar to control the operating position of the transfer tail assembly.

The pivot limiting bar includes at least one receiving groove formed near one of the ends of the pivot limiting bar. The receiving groove is designed to have a contact surface that is recessed from an outer surface of the pivot limiting bar. The depth of the contact surface varies around the circumference of the pivot limiting bar. The pivot limiting bar can be rotated to a desired position and mounted between the side frame members to control the pivoted position of the transfer tail assembly and the end roller relative to the side frame members.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
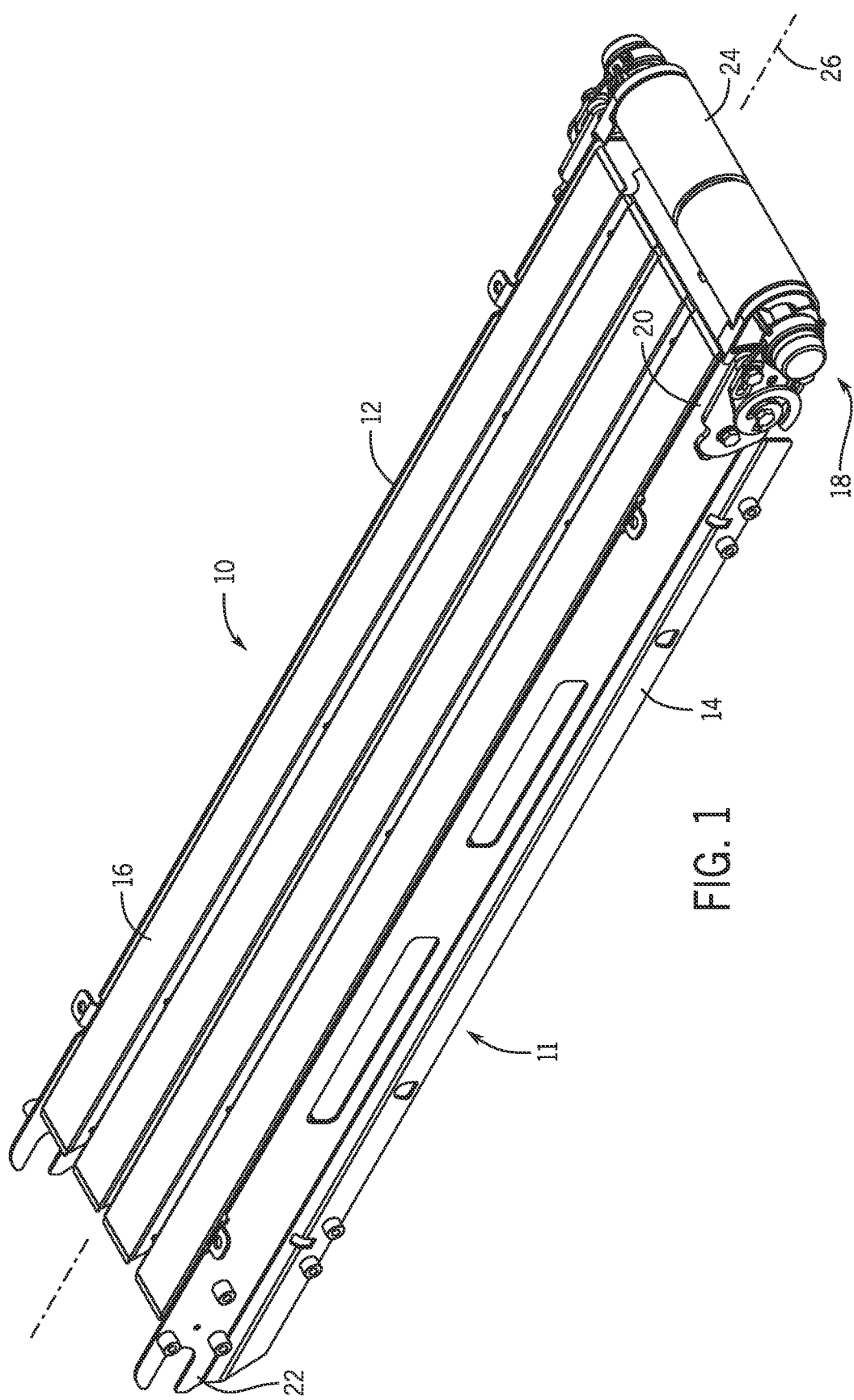
FIG. 1 is a perspective view of a conveyor frame and tensioning device of the present disclosure with the endless conveyor belt removed for clarity.

FIG. 1 illustrates a conveyor assembly 10 that includes a continuous conveyor belt (not shown) used to transport articles. The conveyor assembly 10 includes conveyor frame 11 that includes a pair of side frame members 12, 14 spaced from each other by the width of the conveyor belt. The side frame members 12, 14 are joined by a series of cross members and rail supports. In the embodiment shown in FIG. 1, the conveyor frame 11 includes a top support platform 16 that is formed by a series of slats that extend along the length of the conveyor frame 11 to supports the upper run of the conveyor belt and the articles being moved by the conveyor belt.

The transition from the upper run to the lower run of the conveyor belt occurs over a transfer tail assembly 18. The transfer tail assembly 18 is shown mounted to a first end 20 of the conveyor frame 11 defined by the pair of spaced side frame members 12, 14. A second end 22 of the conveyor frame 11 is designed to receive a drive roller and drive motor assembly to provide the motive force to move the conveyor belt along the overall length of the conveyor assembly. The pair of side frame members 12, 14 are formed from stainless steel and provide the required support and stability for the entire conveyor assembly.

Figure 2:
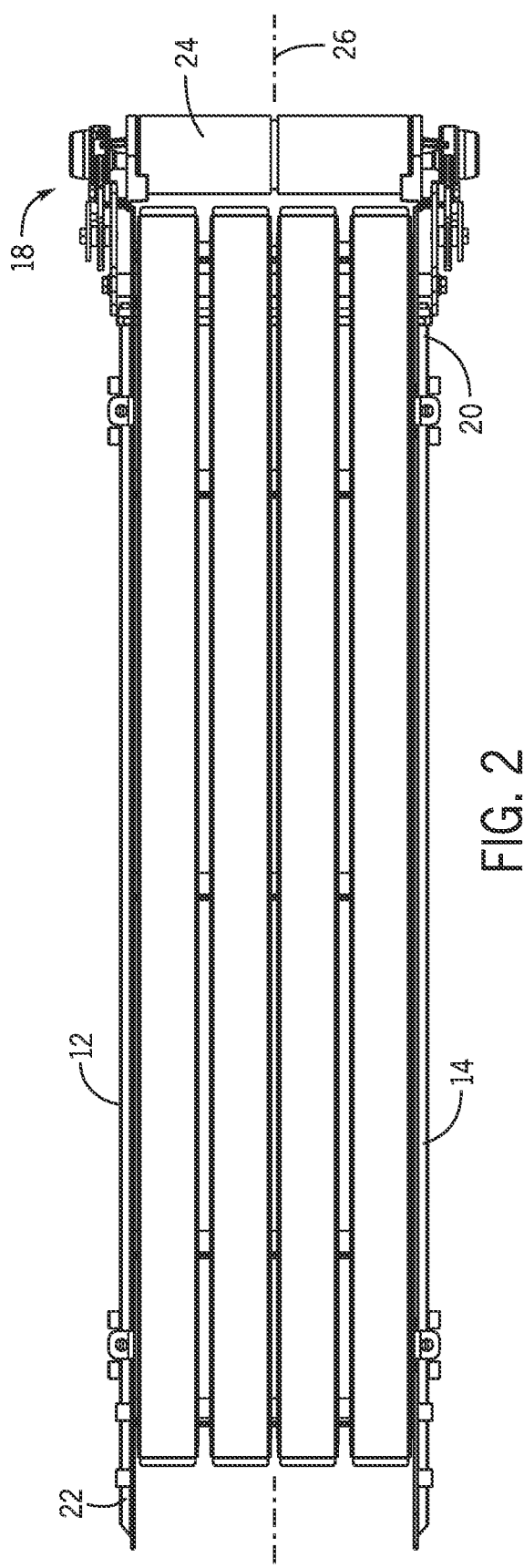
FIG. 2 is a top view of the conveyor frame and tensioning device of the present disclosure.
Figure 3:
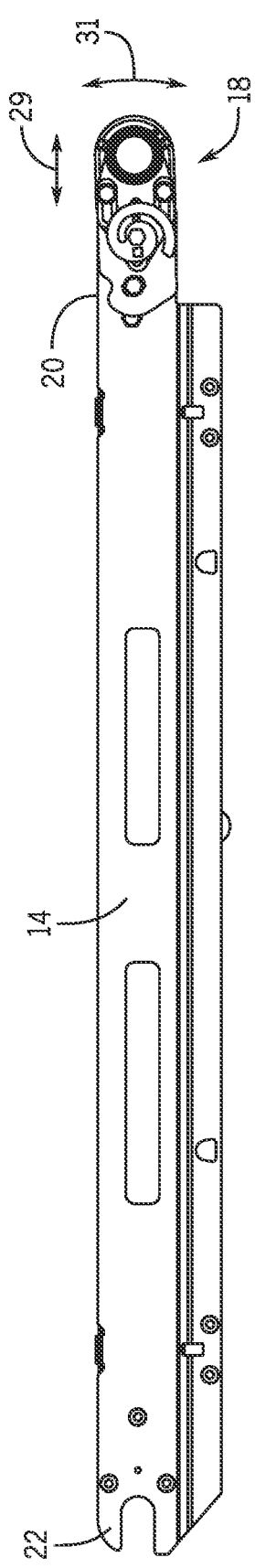
FIG. 3 is a side view of the conveyor frame and tensioning device.

The transfer tail assembly 18 includes an end roller 24 that is rotatably supported at the first end 20 of the pair of side frame members 12, 14. As will be described in detail below, the transfer tail assembly 18 is designed to introduce tension into the conveyor belt by selectively moving the end roller 24 along a conveyor axis 26. In addition to the movement of the end roller 24 along the conveyor axis 26, the transfer tail assembly 18 is designed to allow the end roller 24 to pivot upwards to release tension from the conveyor belt to allow the conveyor belt to be removed for cleaning. The details of the movement of the transfer tail assembly 18 will be described in greater detail below. FIGS. 2 and 3 illustrate both a longitudinal movement (arrow 29) and a pivoting movement (arrow 31) of the entire transfer tail assembly 18.

Figure 4:
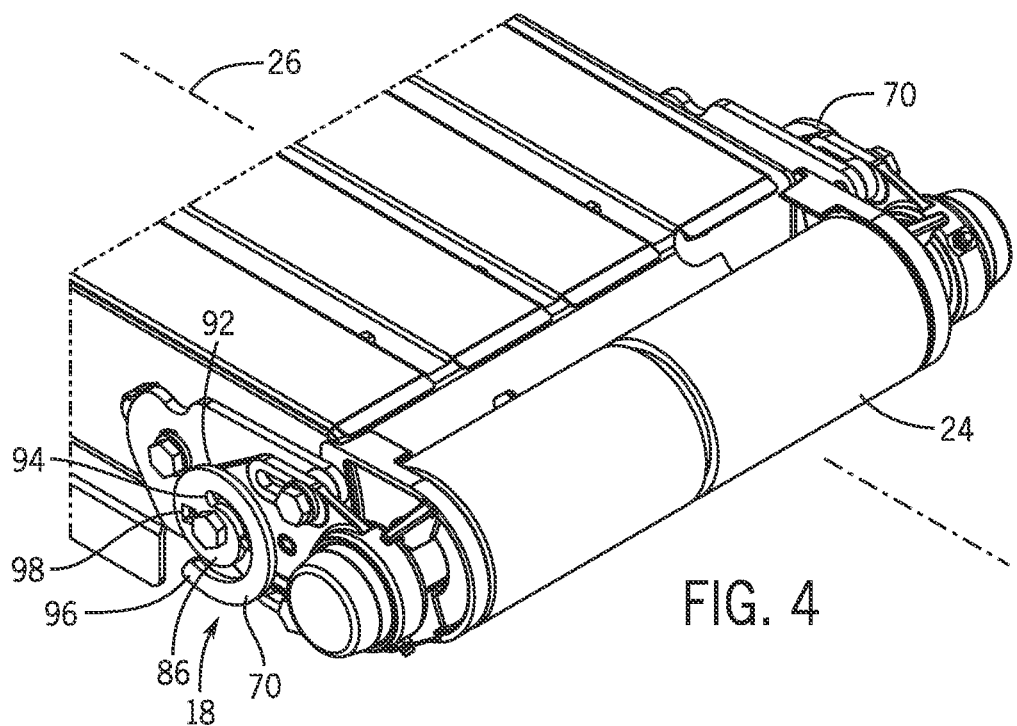
FIG. 4 is a magnified view of the tension roller and tensioning device.
Figure 5:
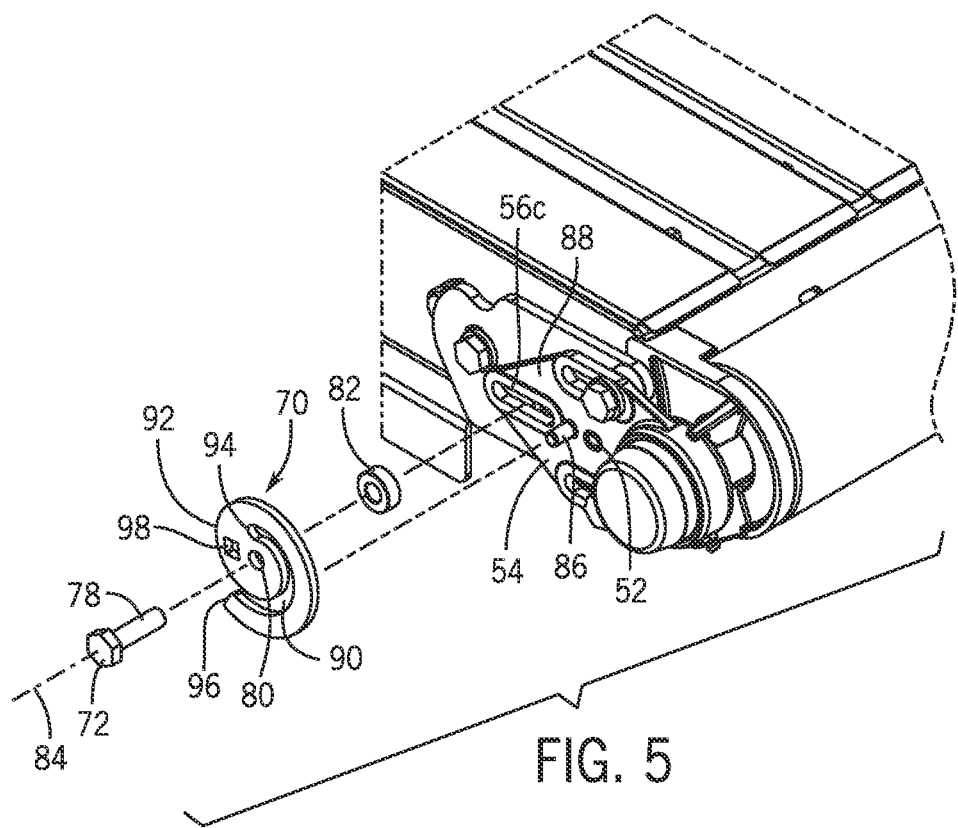
FIG. 5 is a partially exploded view showing the spiral cam of the tensioning device.
Figure 6:
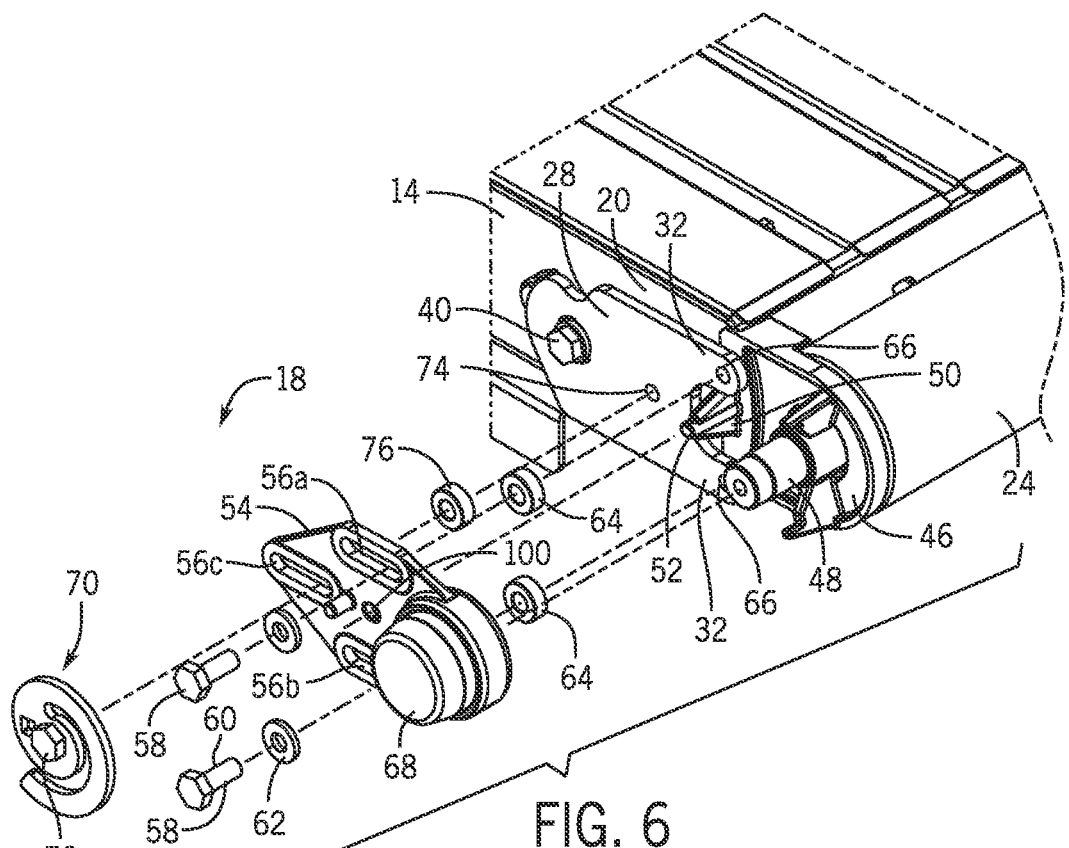
FIG. 6 is a further partially exploded view of the tensioning device.
Figure 7:
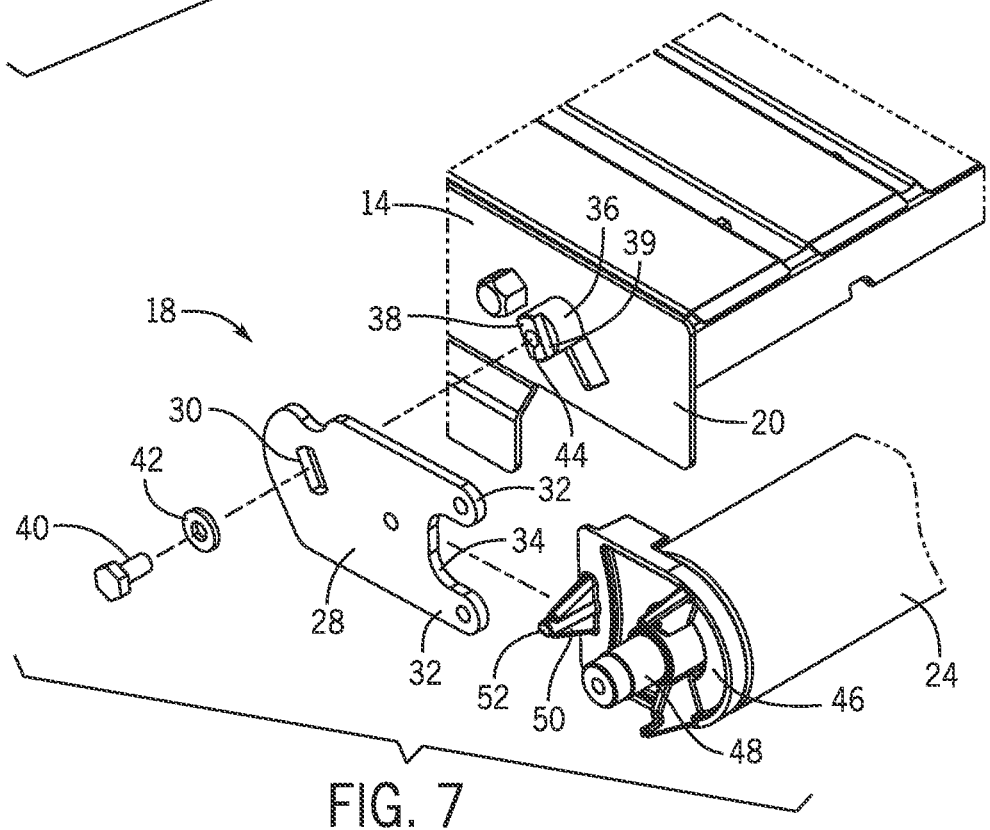
FIG. 7 is a further partially exploded view of the tensioning device.

FIGS. 4-7 generally illustrate the components of the transfer tail assembly 18 of the present disclosure. The transfer tail assembly 18 is shown in the fully assembled condition in FIG. 4 while FIGS. 5-7 illustrate the transfer tail assembly in various states of assembly and disassembly.

Referring first to FIG. 7, the first end 20 of the side frame member 14 is illustrated. The transfer tail assembly 18 includes a side bracket 28 that is mounted to the first end 20 of the side frame member 14. A similar side bracket 28 is mounted to the first end of the second side frame member 12 but is not shown. The side frame bracket 28 is designed such that the side frame bracket 28 can pivot relative to the side frame member 14 but does not move longitudinally along the conveyor axis. The side frame bracket 28 includes an elongated mounting slot 30 formed near one of its ends. The side frame bracket 28 further includes a pair of mounting ears 32 that are spaced from each other to generally define a receiving channel 34. The transfer tail assembly 18 further includes a pivot rod 36 that extends across the width of the conveyor frame as will be described in greater detail below. The pivot rod 36 includes a receiving end 38 that has a generally rectangular shape defined by a pair of spaced flat support walls 39 that extend from the outer end of the pivot rod. The flat support walls 39 create the shape of the receiving end 38 and are designed to be received within the mounting slot 30. The shape of the receiving end 38 and the mounting slot 30 prevents rotation of the pivot rod 36 relative to the side bracket 28. A connector 40 and washer 42 are received within a receiving hole 44 formed in the receiving end 38 to prevent separation of the side bracket 28 from the pivot rod 36.

The transfer tail assembly 18 further includes a roller gurard 46 that is designed to rotatably support one end of the end roller 24. As illustrated in FIG. 7, the mounting shaft 48 of the end roller 24 extends through the roller guard 46 and is supported and rotatable relative to the roller bracket 46 through an end bearing (not shown). The roller guard 46 further includes a standoff 50 that includes an end opening 52. As will become apparent below, the roller guard 46 is not connected to the side bracket 28 and is thus movable relative to the side bracket 28.

Referring now to FIG. 6, once the side bracket 28 has been attached to the first end 20 of the side frame member 14 by the connector 40, additional components of the transfer tail assembly 18 can be installed. Specifically, an adjustment bracket 54 can be mounted to the side bracket 28. The adjustment bracket 54 includes three adjustment channels 56. Each of the adjustment channels 56 has a longitudinal length that is generally parallel to the conveyor axis. As illustrated in FIG. 3, the adjustment bracket 54 includes a pair of front adjustment channels 56a and 56b that are spaced above each other and a rear adjustment channel 56c that is spaced slightly below the upper front adjustment channel 56a and slightly above the lower front adjustment channel 56b. The rear adjustment channel 56c is generally located between the upper and lower adjustment channels 56a and 56b and slightly behind each of these adjustment channels.

The front adjustment channels 56a and 56b each receive one of a pair of connectors 58. Each of the connectors 58 includes a shaft portion 60 that extends through a washer 62 and through the opening formed within the front adjustment channel 56a or 56b. An annular spacer 64 is positioned between the back face of the adjustment bracket 54 and the front face of the side bracket 28. The spacers 64 provide the required spacing between the side bracket 28 and the adjustment bracket 54. Each of the pair of connectors 58 are received within an opening 66 formed in one of the spaced mounting ears 32 formed as part of the side bracket 28. As illustrated in FIG. 6, the standoff 50 formed as part of the roller bracket 46 is located between the pair of mounting ears 32.

The adjustment bracket 54 further includes a roller shaft receiving portion 68 that is designed to receive the mounting shaft 48 of the end roller 24. The receiving portion 68 of the adjustment bracket 54 provides rotational support for the mounting shaft and the entire roller guard 46. In this manner, the movement of the adjustment bracket 56 along the conveyor axis 26 will result in corresponding movement of both the end roller 24 and the roller guard 46 along the conveyor axis 26, which will adjust the tension in the conveyor belt when installed.

The transfer tail assembly 18 further includes a cam 70 that is mounted to the side bracket 28 through a cam connector 72 that extends through the rear adjustment channel 56c and is received within a cam opening 74 formed in the side bracket 28. A spacer 76 is positioned between the adjustment bracket 54 and the side bracket 28 and surrounds a shaft of the cam connector 72.

Referring now to FIG. 5, the cam 70 is shown removed from the adjustment bracket 54. The cam 70 is mounted for rotation relative to the adjustment bracket 54 by the cam connector 72. The cam connector 72 has a shaft portion 78 that extends through a center opening 80 and a second spacer 82 that is located between the back surface of the cam 70 and the rear adjustment channel 56c. The end of the shaft 78 is received within the cam opening 74 formed in the side bracket 28, as was shown in FIG. 6. The cam connector 72 defines a center axis 84 about which the cam 70 rotates as will be described below.

As can be seen in FIG. 5, the adjustment bracket 54 includes a drive pin 86 that protrudes from the otherwise planar front face surface 88 of the adjustment bracket 54. The drive pin 86 can be formed with the adjustment bracket 54 or can be added by welding or other attachment method after the formation of the adjustment bracket 54.

As can be seen in FIG. 5, the cam 70 is a spiral cam that is designed to rotate about the center axis 84. The spiral cam 70 is formed from a metallic material and includes a spiral shaped receiving channel 90 that is sized to receive the drive pin 86. The receiving channel 90 includes a spiral contact surface 92 that extends from a first end 94 to a second end 96. During rotating movement of the spiral cam 70, the drive pin 86 rides along the spiral contact surface 92.

As can be understood in FIG. 5, the distance of the spiral contact surface 92 from the center axis 84 increases from the first end 94 to the second end 96 of the spiral contact surface 92. In the illustrated embodiment, the spiral contact surface 92 extend over 360°, which increases that amount of throw created by the contact surface 92 relative to a typical cam. The spiral contact surface 92 shown in FIG. 5 extends slightly more than 540° from the first end 94 to the second end 96 such that the spiral cam could rotate 1½ turns while the drive pin 86 remains in contact with and moves along the spiral contact surface 92. Thus, as the spiral cam 70 rotates, the distance of the drive pin 86, which is in contact with the spiral contact surface 92, from the center axis 84 increases when the spiral cam is rotated in the counterclockwise direction and decreases when the spiral cam is rotated in the clockwise direction. The spiral shape of the spiral contact surface 92 increases the amount of lateral movement (throw) of the drive pin 86 relative to the overall diameter of the spiral cam 70 as compared to a typical cam having a cam surface that is typically less than 360°. The spiral cam 70 includes a tool opening 98 that has a generally rectangular shape and is designed and sized to receive a tool having a corresponding end. The tool is used to rotate the spiral cam 70 about the center axis 84 to adjust the position of the end roller 24.

FIG. 4 illustrates a fully assembled condition for the transfer tail assembly 18. In this condition, a tool can be received within the tool opening 98. FIG. 4 illustrates the spiral cam 70 in an intermediate position in which the drive pin 86 is located between the first end 94 and the second end 96 of the spiral contact surface 92. As described, the spiral cam 70 can be rotated in either direction to move the end roller 24 in a desired direction along the conveyor axis 26.

Prior to rotation, the pair of connectors 58 and the cam connector 58 are loosened to allow movement of the adjustment bracket 54 relative to the side bracket 28. The spiral cam 70 is then rotated to move the end roller 24 in the desired direction to either increase or decrease tension in the conveyor belt. Once the end roller 24 is in the desired position, the connectors 58 and the cam connector 72 can be tightened to hold the adjustment bracket 54 in position relative to the side bracket 28. As illustrated in FIG. 4, a spiral cam 70 can be included on both sides of the conveyor assembly, although it is also contemplated that the spiral cam could be included on only one of the two sides of the conveyor assembly.

Referring back to FIG. 6, the end 52 of the standoff 50 formed on the roller bracket 46 is received within an opening 100 formed in the adjustment bracket 54. The engagement between the standoff 50 and the adjustment bracket 54, along with the receipt of the mounting shaft 48 within the receiving portion 68, results in movement of the roller bracket 46 with the movement of the adjustment bracket 54.

Figure 8:
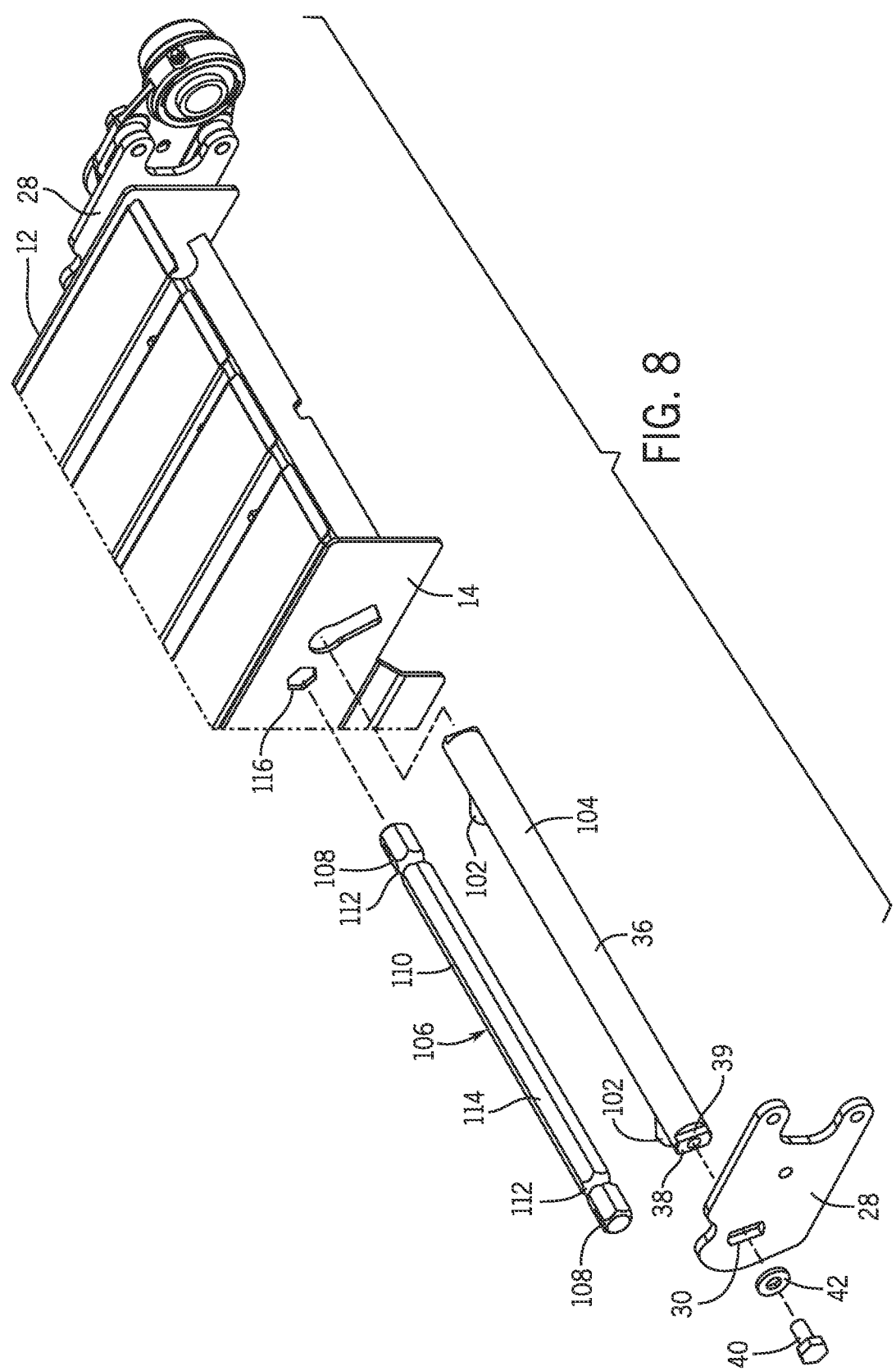
FIG. 8 is an exploded view showing the tip up limiting device.

FIG. 8 illustrates the mounting of the pair of side brackets 28 to each of the side frame members 12, 14. In accordance with the present disclosure, the side brackets 28 are able to pivot relative to the stationary side frame members 12, 14 to lift the entire transfer tail assembly, including the end roller, to release the tension on the conveyor belt, which is particularly helpful for the complete removal of the conveyor belt from the conveyor frame.

As described previously, the transfer tail assembly includes the pivot rod 36 that extends between the pair of side frame members 12, 14. The pivot rod 36 includes a pair of receiving ends 38 that have the pair of spaced flat support walls 39. The receiving ends 38 are each received within a mounting slot 30 formed in the side bracket 28. The pivot rod 36 further includes a pair of pivot limiting arms 102 that extend from the circular outer surface 104 of the pivot rod 36. The pivot limiting arms 102 are designed to control the amount of pivoting movement of the pivot rod 36 in a manner to be described below.

The transfer tail assembly further includes a pivot limiting bar 106 that also extends between the pair of side frame members 12, 14. The pivot limiting bar 106 includes two end portions 108 and a center portion 110. The pair of end portions 108 are spaced from the center portion by one of a pair of receiving grooves 112. The receiving grooves 112 are recessed from the outer surface of the pivot limiting bar by a distance that varies along the outer circumference of the pivot limiting bar. Each of the receiving grooves 112 is designed to receive one of the two pivot limiting arms 102 formed on the pivot rod 36.

In the embodiment shown in FIG. 8, the outer circumference of the pivot limiting bar 106 has a hexagonal shape that includes six defined planar side surfaces 114. The hexagonal outer surface of the pivot limiting bar 106 extends to each of the end portions 108. The end portions 108 are designed to be received within a locking opening 116 formed in each of the two side frame members 12, 14. The hexagonal shape of the locking opening 116 and the outer surface of the end portions 108 of the pivot limiting bar 106 prevents rotation of the pivot limiting bar 106 when mounted between the pair of side frame members 12, 14. Although a hexagonal shape is shown in the embodiment, it is contemplated that other shapes could be utilized to prevent rotational movement of the pivot limiting bar 106 relative to the spaced side frame members 12, 14.

Figure 9:
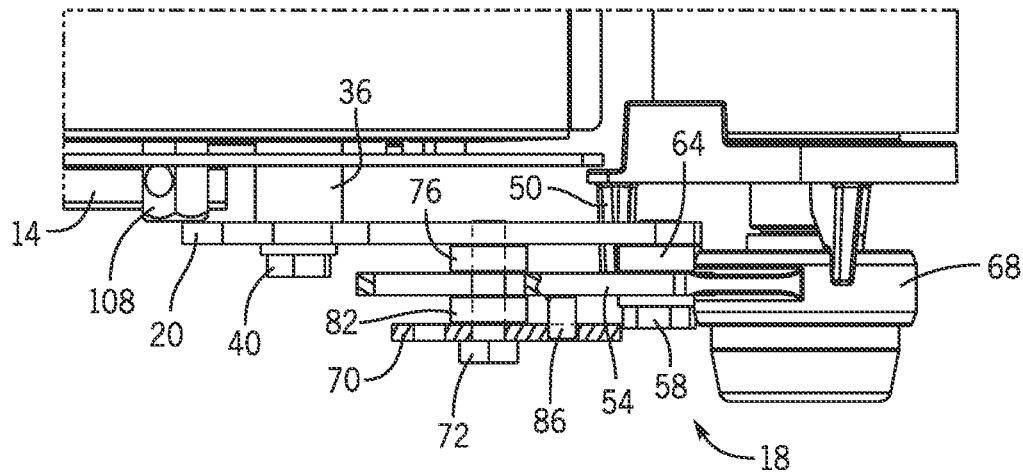
FIG. 9 is a top view showing the mounting of the tension roller.

FIG. 9 illustrates an assembled, top view of the transfer tail assembly 18 of the present disclosure. The view shown in FIG. 9 shows the spacing between the side bracket 28, the adjustment bracket 54 and spiral cam 70.

Figure 10A:
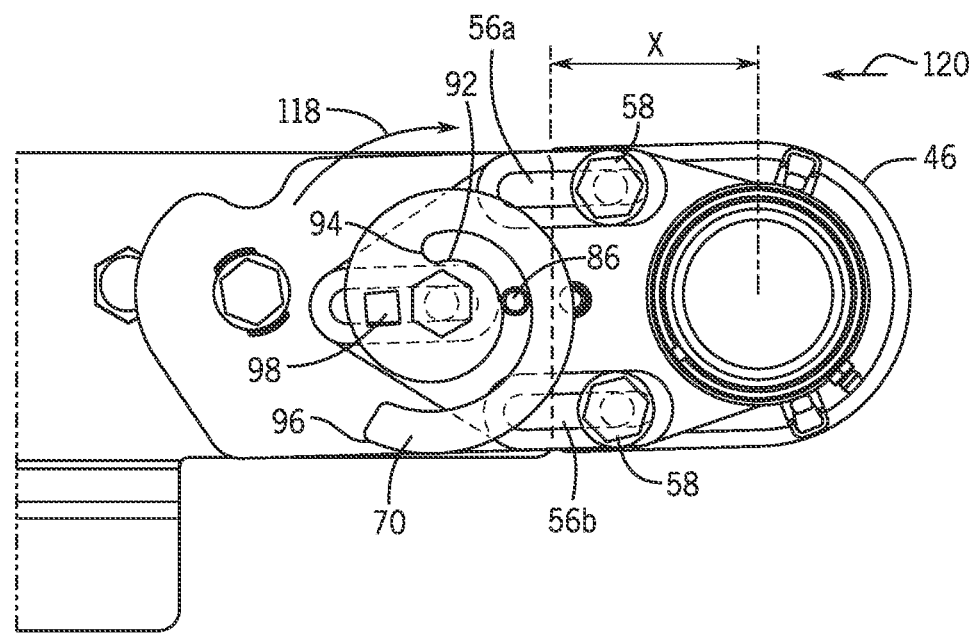
FIG. 10A is a side view of the tension roller in a fully retracted position and the spiral cam in one end position.
Figure 10B:
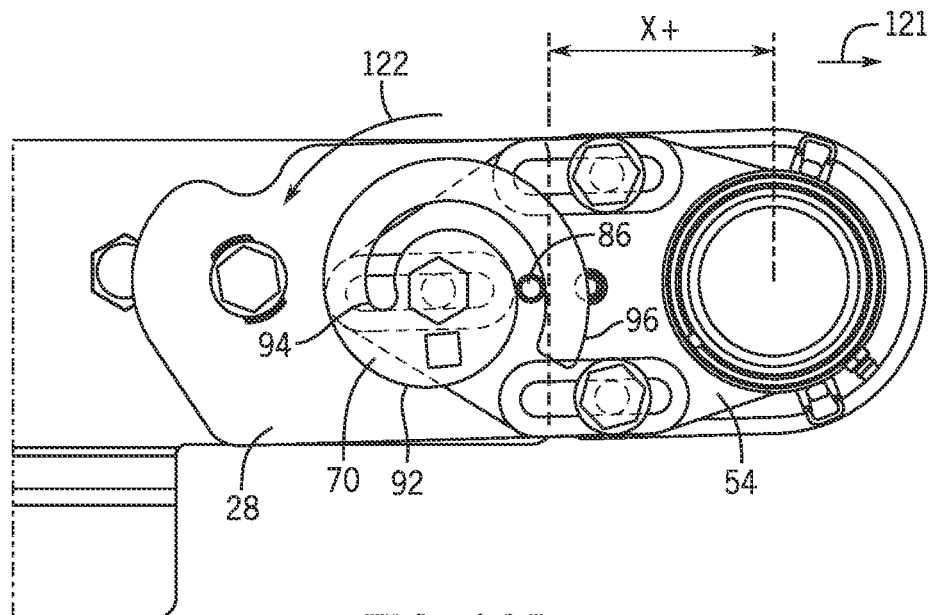
FIG. 10B is a side view of the tension roller in a partially extended position and the spiral cam in a partially rotated position.
Figure 10C:
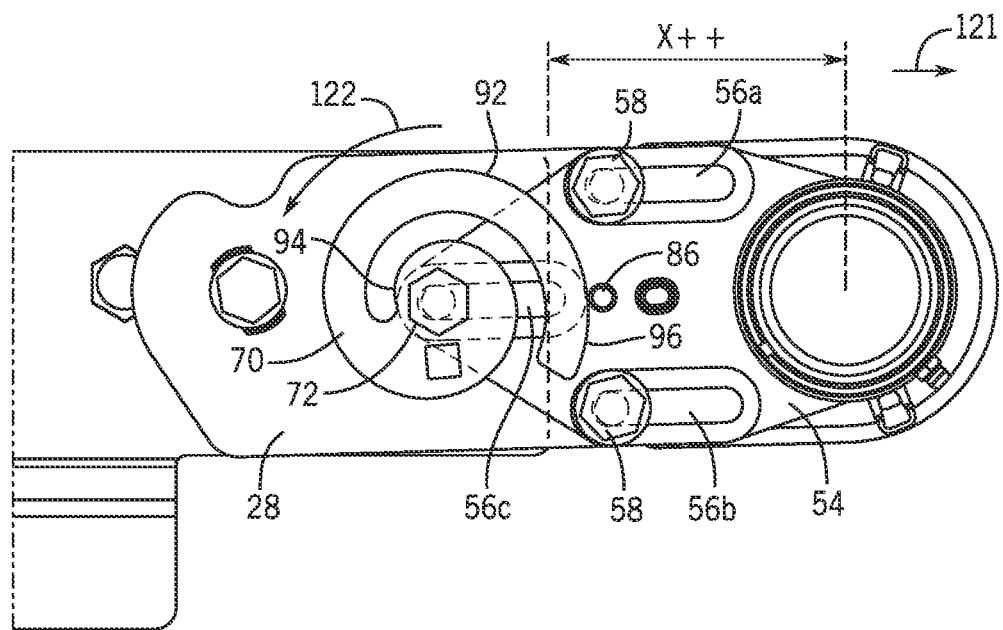
FIG. 10C is a side view of the tension roller in a fully extended position and the spiral cam in a full rotated second end position.

FIGS. 10A-10C show the tension adjustment that is possible by utilizing the transfer tail assembly and specifically the spiral cam 70 of the present disclosure. Referring first to FIG. 10A, the end roller mounted between the pair of roller brackets 46 is shown near the fully retracted position. In this position, the pair of connectors 58 are positioned near the right most end of one of the front adjustment channels 56a and 56b. In this position, the drive pin 86 is positioned in contact with the spiral contact surface 92 at a location closer to the first end 94 than the second end 96. When a tool is inserted into the tool opening 98 and the spiral cam 70 is rotated in the clockwise direction shown by arrow 118, the drive pin 86 will move closer to the first end 94 and would cause further retraction of the roller as shown by arrow 120. The longitudinal movement of the roller in the direction shown by arrow 120 is limited by the physical interaction between the pair of connectors 58 and the end of the front adjustment channels 56a and 56b. Prior to rotating the spiral cam 70, the pair of connectors 58 are loosened to allow the relative movement of the adjustment bracket 54 relative to the side bracket 28.

Referring now to FIG. 10B, if the user wishes to increase tension in the conveyor belt, the end roller will need to be moved in the direction shown by arrow 121. To move the end roller in this direction, the spiral cam 70 is rotated in a counterclockwise direction, as illustrated by arrow 122. When the spiral cam 70 is rotated in the counterclockwise direction, the drive pin 86 moves further along the spiral contact surface 92 away from the first end 94 and toward the second end 96. Since the distance of the spiral contact surface 92 increases from the center axis of the spiral cam from the first end 94 to the second end 96, the rotation of the spiral cam 70 moves the drive pin 86 away from the center axis. Since the drive pin 86 is formed as part of the adjustment bracket 54, the rotational movement of the spiral cam 70 in the counterclockwise direction shown by arrow 122 causes the end roller to move in the direction shown by arrow 122.

Further rotation in the counterclockwise direction, as again shown by arrow 122 in FIG. 10C, causes the drive pin 86 to move further along the spiral contact surface 92 to nearly the second end 96. Again, since the distance of the spiral contact surface 92 from the center axis of rotation increases from the first end 94 to the second end 96, the distance of the end roller from the stationary side frame members increases, thereby increasing the amount of tension on the conveyor belt. As shown in FIG. 10C, each of the connectors 58 contacts the opposite end of the front adjustment channels 56a and 56b to limit the longitudinal movement of the end roller. In addition, the cam connector 72 moves within the rear adjustment channel 56c and also contacts the end of the adjustment channel 56c. In this manner, the pair of connectors 58 and the cam connector 72 provide the required support and limit the overall movement of the adjustment bracket 54 relative to the side brackets 28. The pair of connectors 58 and the cam connector 72 also hold the adjustment bracket 54 in a desired position to maintain tension on the conveyor belt.

If the user wishes to decrease the tension in the conveyor belt, the connectors 58 and the cam connector 72 are loosened and the spiral cam 70 can be rotated in a clockwise direction to cause the drive pin 86 to move closer to the first end 94 of the spiral cam contact surface 92. In this manner, the direction and amount of rotation of the spiral cam 70 can be used to control the amount of tension in the conveyor belt.

Figure 11:
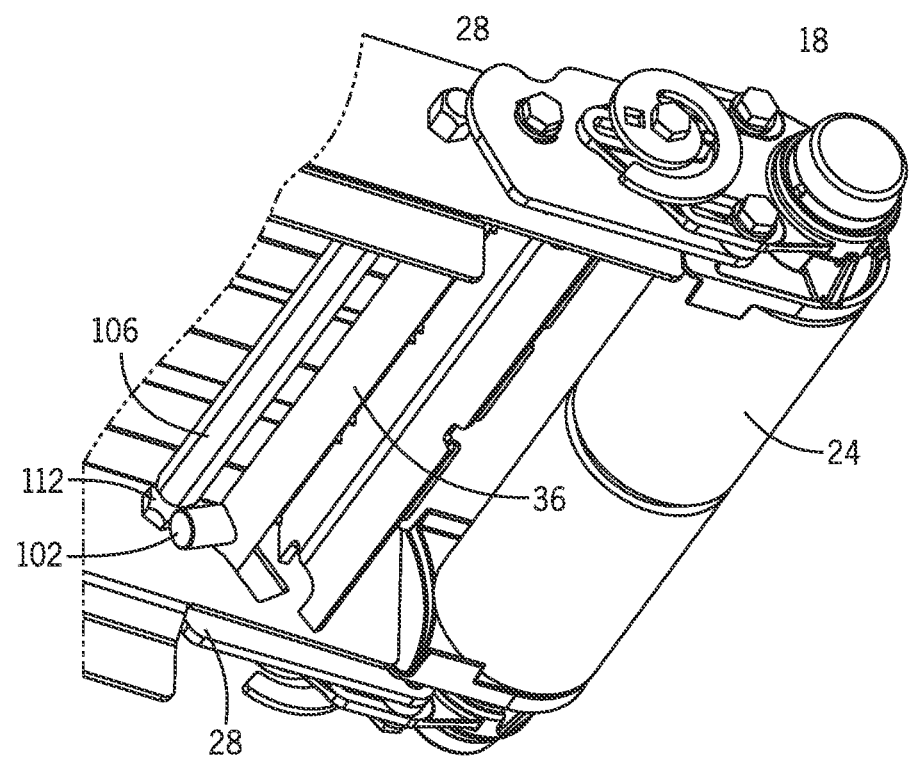
FIG. 11 is a bottom perspective view showing the pivot limiting mechanism of the present disclosure.
Figure 12:
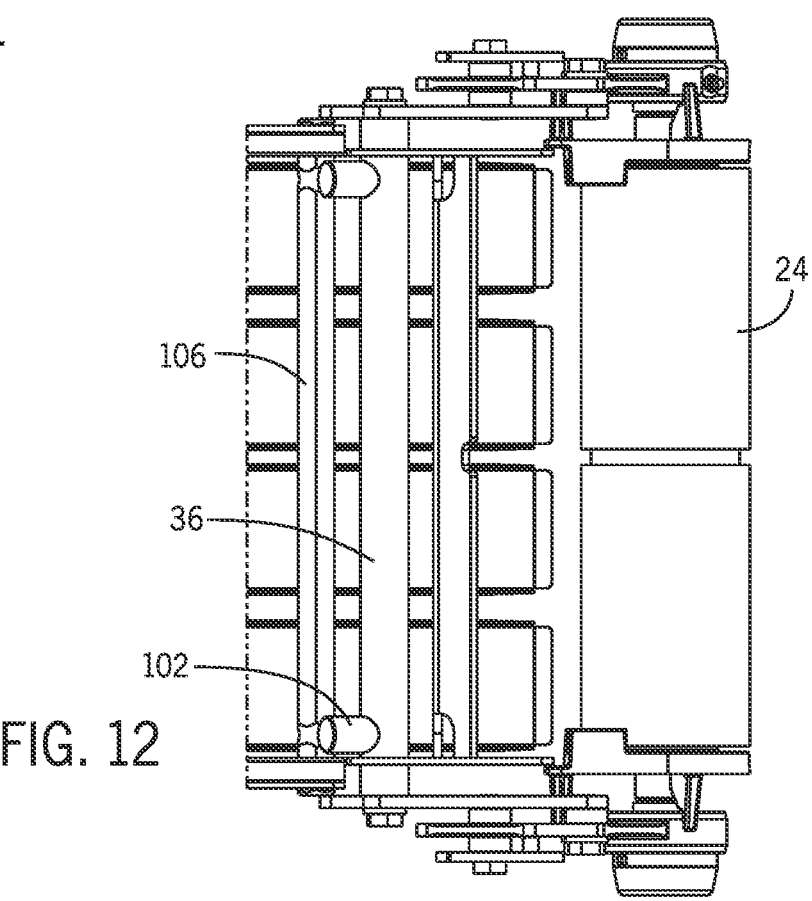
FIG. 12 is a bottom view showing the pivot limiting mechanism.

In addition to the longitudinal movement of the end roller along the conveyor axis 26, the entire transfer tail assembly 18 can be pivoted upward to reduce tension in the conveyor belt to allow the conveyor belt to be removed from the conveyor assembly. As shown in FIGS. 11 and 12, each of the pair of side brackets 28 is securely mounted to one of the opposite ends of the pivot rod 36. The pivot rod 36 includes a pair of pivot limiting arms 102 that are each received within a receiving groove 112 formed in the pivot limiting bar 106. As described previously, the depth of the receiving grooves 112 varies around the circumference of the pivot limiting bar 106.

Figure 13A:
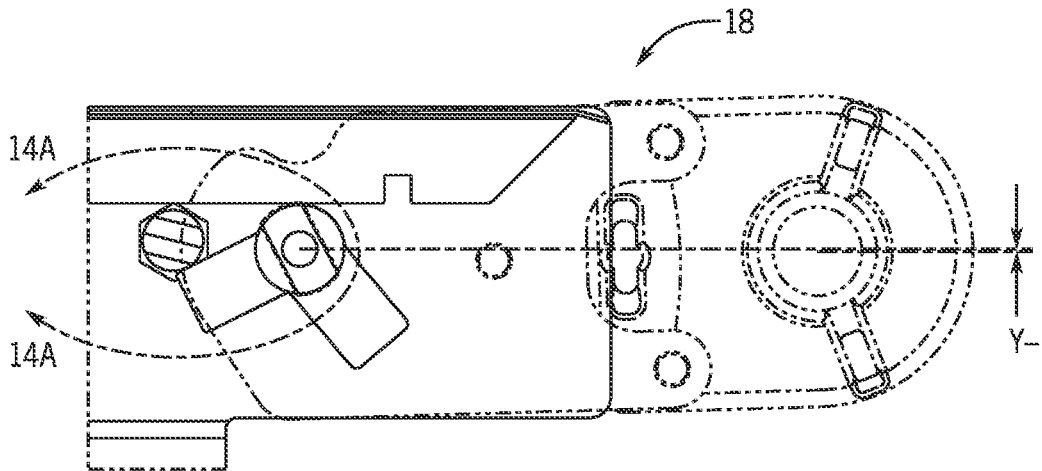
FIG. 13A is a side view showing the tensioning device in a completely lowered position.
Figure 14A:
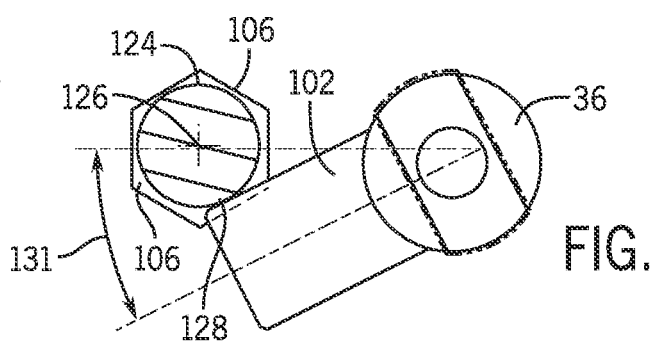
FIG. 14A is a view taken along line 14A-14A of FIG. 13A.
Figure 13B:
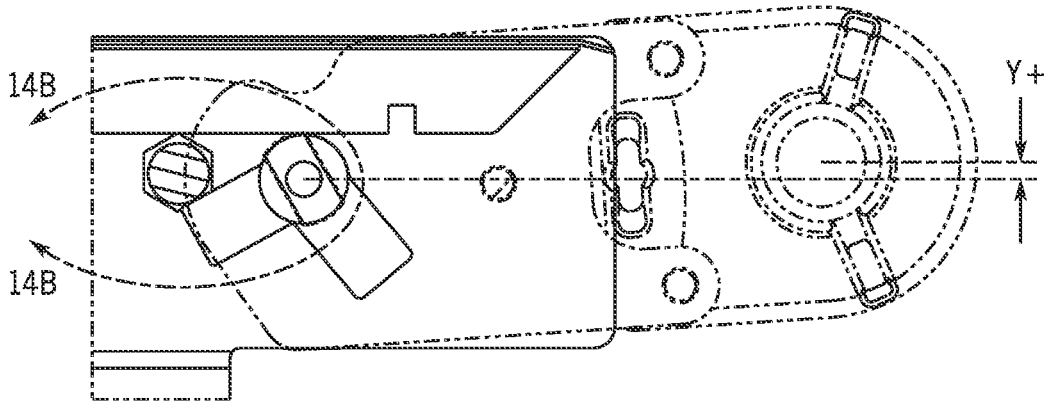
FIG. 13B is a side view similar to FIG. 13A showing the tensioning device is a modified lower position.
Figure 14B:
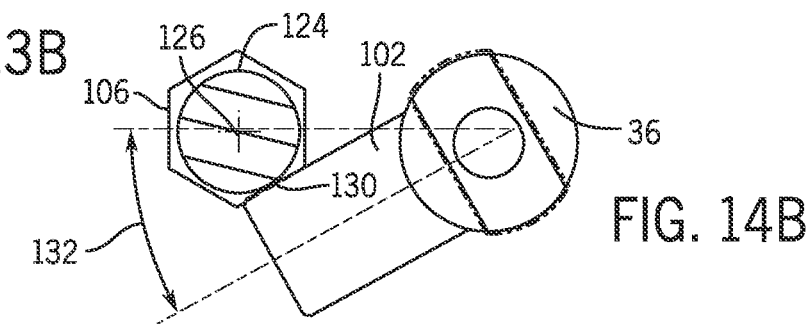
FIG. 14B is a view taken along line 14B-14B of FIG. 13B.

FIGS. 13A and 14A illustrate the transfer tail assembly 18 pivoted to its lowest pivoting position. In this position, the pivot limiting arms 102 contact the outer surface 124 formed as part of the receiving groove 112. As shown in FIG. 14A, the distance of the outer surface 124 in the receiving groove from the center axis 126 of the pivot limiting bar 106 varies. This varied distance can be seen in FIGS. 14A and 14B. In the embodiment shown in FIG. 14A, the pivot limiting arms 102 contact the outer surface 124 at a contact point 128 at a location in which the outer surface 124 is closest to the center axis 126. In the embodiment shown in FIG. 14B, the pivot limiting arm 102 contacts the outer surface 124 at a contact point 130 at a location where the outer surface 124 is the largest distance from the center axis 126. As can be understood in a comparison between FIGS. 14A and 14B, the angle 131 in the position shown in FIG. 14A is less than the angle 132 shown in FIG. 14B due to the difference in distance between the outer surface 124 and the center axis 126. In this manner, the user can selectively position the pivot limiting bar 106 by removing and rotating the pivot limiting bar 106 to control the pivoting movement of the end roller and the entire transfer tail assembly. The difference in this pivoting position is shown by a comparison between FIGS. 13A and 13B.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A tail assembly for use with a conveyor assembly having a continuous conveyor belt having an upper run and a lower run supported between a pair of side frame members that each extend along a conveyor axis from a first end to a second end, the tail assembly comprising:

a pair of side brackets mounted to the pair of side frame members;

a pair of adjustment brackets mounted to the pair of side brackets and movable along the conveyor axis, at least one of the adjustment brackets including a drive pin extending from the adjustment bracket;

a end roller rotatably mounted between the pair of adjustment brackets at the first end of the side frame member;

a cam rotatably mounted to one of the pair of side brackets about a center axis, the cam including a spiral contact surface in contact with the drive pin extending from one of the pair of adjustment brackets, wherein the radial distance of the spiral contact surface from the center axis increases from a first end to a second end, wherein rotation of the cam causes the pair of adjustment brackets and the end roller to move along the conveyor axis.

2. The tail assembly of claim 1 wherein the spiral contact surface extends more than 360°.

3. The tail assembly of claim 1 wherein the pair of adjustment brackets each include a plurality of adjustment channels that extend parallel to the conveyor axis, each of the adjustment channels receiving a connector that movably joins the adjustment bracket to one of the side brackets.

4. The tail assembly of claim 1 wherein the cam includes a drive opening spaced from the center axis and configured to receive a drive tool.

5. The tail assembly of claim 1 wherein the cam includes a receiving channel sized to receive the drive pin and defined at one edge by the spiral contact surface, wherein the spiral contact surface extends past the receiving channel such that the drive pin is movable into and out of the receiving channel as the cam rotates and the drive pin moves along the spiral contact surface.

6. A tail assembly for use with a conveyor assembly having a continuous conveyor belt having an upper run and a lower run supported between a pair of side frame members that each extend along a conveyor axis from a first end to a second end, the tail assembly comprising:
a pair of side brackets mounted to the pair of side frame members;
a pair of adjustment brackets mounted to the pair of side brackets and movable along the conveyor axis;
a end roller rotatably mounted between the pair of adjustment brackets at the first end of the side frame member;
a cam rotatably mounted to one of the pair of side brackets and in contact with one of the pair of adjustment brackets,
wherein rotation of the cam causes the pair of adjustment brackets and the end roller to move along the conveyor axis,
wherein the pair of side brackets are pivotably mounted to the pair of side frame members such that the entire tail assembly can be pivoted relative to the pair of side frame members.

7. The tail assembly of claim 6 further comprising:
a pivot rod extending between the pair of side frame members and connected to each of the pair of side bracket;
a pair of pivot limiting arms extending from the pivot rod; and
a pivot limiting bar extending between the pair of side frame members,
wherein the pivot limiting arms contact the pivot limiting bar to define an upward pivot position for the tail assembly.

8. The tail assembly of claim 7 wherein the pivot limiting bar includes a pair of spaced receiving grooves that each receive one of the pivot limiting arms upon pivoting movement of the tail assembly.

9. The tail assembly of claim 8 wherein the pivot limiting bar has an outer surface and the depth of the receiving grooves from the outer surface varies around a circumference of the pivot limiting bar.

10. The tail assembly of claim 9 wherein the outer surface of the pivot limiting bar has a series of edges.

11. A tail assembly for use with a conveyor assembly having a continuous conveyor belt having an upper run and a lower run supported between a pair of side frame members that each extend along a conveyor axis from a first end to a second end, the tail assembly comprising:
a pair of side brackets each securely mounted to one of the pair of side frame members;
a pair of adjustment brackets movable along the conveyor axis relative to the pair of side brackets, at least one of the adjustment brackets including a drive pin extending from the adjustment bracket;
a end roller rotatably mounted between the pair of adjustment brackets at the first end of the side frame member;
a spiral cam rotatably mounted to one of the pair of side brackets and in contact with one of the pair of adjustment brackets, the spiral cam being rotatable about a center axis and including a spiral contact surface that extends more than 360° and is in contact with the drive pin on one of the adjustment brackets, wherein the radial distance of the spiral contact surface from the center axis increase from a first end to a second end,
wherein rotation of the spiral cam causes drive pin to move along the spiral contact surface such that rotation of the spiral cam moves the drive pin parallel to the conveyor axis and causes the pair of adjustment brackets and the end roller to move along the conveyor axis in a direction controlled by the direction of rotation of the spiral cam.

12. The tail assembly of claim 11 wherein the pair of adjustment brackets each include a plurality of adjustment channels that extend parallel to the conveyor axis, each of the adjustment channels receiving a connector that movably joins the adjustment bracket to one of the side brackets.

13. The tail assembly of claim 11 wherein the spiral cam includes a receiving channel sized to receive the drive pin and defined at one edge by the spiral contact surface, wherein the spiral contact surface extends past the receiving channel such that the drive pin is movable into and out of the receiving channel as the spiral cam rotates and the drive pin moves along the spiral contact surface.

14. A tail assembly for use with a conveyor assembly having a continuous conveyor belt having an upper run and a lower run supported between a pair of side frame members that each extend along a conveyor axis from a first end to a second end, the tail assembly comprising:
a pair of side brackets each securely mounted to one of the pair of side frame members;
a pair of adjustment brackets movable along the conveyor axis relative to the pair of side brackets;
a end roller rotatably mounted between the pair of adjustment brackets at the first end of the side frame member;
a pivot rod extending between the pair of side frame members and connected to each of the pair of side frame bracket;
a pair of pivot limiting arms extending from the pivot rod; and
a pivot limiting bar extending between the pair of side frame members,
wherein the pivot limiting arms contact the pivot limiting bar to define an upward pivot position for the tail assembly.

15. The tail assembly of claim 14 wherein the pivot limiting bar includes a pair of spaced receiving grooves that each receive one of the pivot limiting arms upon pivoting movement of the tail assembly.

16. The tail assembly of claim 15 wherein the pivot limiting bar has an outer surface and the depth of the receiving grooves from the outer surface varies around a circumference of the pivot limiting bar.

17. The tail assembly of claim 14 wherein the outer surface of the pivot limiting bar has a series of flat edges.

* * * * *